US012052789B2

(12) United States Patent
Husted et al.

(10) Patent No.: US 12,052,789 B2
(45) Date of Patent: *Jul. 30, 2024

(54) ESTABLISHING AND TERMINATING WIRELESS LINKS

(71) Applicant: Google LLC, Mountain View, CA (US)

(72) Inventors: Paul Husted, San Jose, CA (US); Nihar Jindal, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/196,337

(22) Filed: May 11, 2023

(65) Prior Publication Data

US 2023/0284316 A1   Sep. 7, 2023

Related U.S. Application Data

(63) Continuation of application No. 17/457,872, filed on Dec. 6, 2021, now Pat. No. 11,690,125, which is a
(Continued)

(51) Int. Cl.
*H04W 76/19* (2018.01)
*H04B 17/318* (2015.01)
(Continued)

(52) U.S. Cl.
CPC .......... *H04W 76/19* (2018.02); *H04B 17/318* (2015.01); *H04L 1/0003* (2013.01);
(Continued)

(58) Field of Classification Search
CPC . H04W 24/10; H04W 28/0268; H04W 48/12; H04W 48/16; H04W 48/20;
(Continued)

(56) References Cited

U.S. PATENT DOCUMENTS

| 6,507,740 B2 | 1/2003 | Shi |
| 7,808,956 B2 | 10/2010 | Petrie et al. |

(Continued)

FOREIGN PATENT DOCUMENTS

| EP | 0929203 | 7/1999 |
| EP | 2775763 | 7/2018 |

(Continued)

OTHER PUBLICATIONS

International Searching Authority, International Search Report and Written Opinion mailed May 29, 2019, issued in connection with International Patent Application No. PCT/US2018/065683, filed on Dec. 14, 2018, 19 pages.

*Primary Examiner* — Joseph Arevalo
(74) *Attorney, Agent, or Firm* — McDonnell Boehnen Hulbert & Berghoff LLP

(57) ABSTRACT

A wireless communication device identifies an access point for a wireless network. The device initiates a connection procedure to establish a wireless connection between the wireless communication device and the access point, and the connection procedure includes: (i) selecting a degraded set of uplink transmission quality parameters that correspond to a higher signal-to-noise (SNR) ratio than a baseline set of uplink transmission quality parameters, and (ii) transmitting messages from the wireless communication device to the access point during the connection procedure according to the degraded set of uplink transmission quality parameters. The wireless network connection can be established between the wireless communication device and the access point as a result of completion of the connection procedure, despite the wireless communication device transmitting messages to the access point during the connection procedure according to the degraded set of uplink transmission quality parameters.

20 Claims, 7 Drawing Sheets

Related U.S. Application Data continuation of application No. 16/582,355, filed on Sep. 25, 2019, now Pat. No. 11,219,083, which is a continuation of application No. PCT/US2018/065682, filed on Dec. 14, 2018.

(60) Provisional application No. 62/599,370, filed on Dec. 15, 2017.

(51) Int. Cl.

| | | |
|---|---|---|
| *H04L 1/00* | (2006.01) | |
| *H04W 24/10* | (2009.01) | |
| *H04W 28/02* | (2009.01) | |
| *H04W 48/16* | (2009.01) | |
| *H04W 76/30* | (2018.01) | |

(52) U.S. Cl.
CPC ....... *H04W 24/10* (2013.01); *H04W 28/0268* (2013.01); *H04W 48/16* (2013.01); *H04W 76/30* (2018.02)

(58) Field of Classification Search
CPC ............. H04W 52/146; H04W 52/241; H04W 52/246; H04W 52/50; H04W 76/19; H04W 76/30; H04L 1/0003
USPC .......................... 370/329, 252, 216, 312, 241
See application file for complete search history.

(56) References Cited

U.S. PATENT DOCUMENTS

| | | | |
|---|---|---|---|
| 7,822,044 B2 | 10/2010 | Lee et al. | |
| 8,160,631 B2 | 4/2012 | Raghothaman et al. | |
| 8,774,710 B2 | 7/2014 | Kawaguchi et al. | |
| 9,571,053 B1 | 2/2017 | Cousinard et al. | |
| 9,753,562 B2 | 9/2017 | Reunamaki et al. | |
| 2005/0063356 A1 | 3/2005 | Larsen et al. | |
| 2005/0113106 A1 | 5/2005 | Duan et al. | |
| 2005/0124344 A1 | 6/2005 | Laroia et al. | |
| 2005/0124345 A1 | 6/2005 | Laroia et al. | |
| 2010/0167777 A1 | 7/2010 | Raghothaman et al. | |
| 2010/0317298 A1 | 12/2010 | Hakansson et al. | |
| 2014/0071967 A1 | 3/2014 | Velasco | |
| 2014/0073288 A1 | 3/2014 | Velasco | |
| 2014/0269540 A1* | 9/2014 | Wang ................ H04W 72/1215 370/329 |
| 2014/0307818 A1 | 10/2014 | Jindal et al. | |
| 2016/0373984 A1 | 12/2016 | Hara | |
| 2017/0078887 A1 | 3/2017 | Barriac et al. | |
| 2017/0127453 A1* | 5/2017 | Adachi ................. H04L 5/0044 |
| 2017/0188370 A1 | 6/2017 | Fu et al. | |
| 2017/0347361 A1 | 11/2017 | Tsuboi et al. | |
| 2017/0353226 A1 | 12/2017 | Homchaudhuri et al. | |
| 2017/0366999 A1 | 12/2017 | Tsuboi et al. | |
| 2018/0020378 A1 | 1/2018 | Tsuboi et al. | |
| 2018/0234904 A1 | 8/2018 | Lee et al. | |
| 2019/0297546 A1 | 9/2019 | Likar et al. | |
| 2020/0389799 A1 | 12/2020 | Young et al. | |
| 2021/0153040 A1* | 5/2021 | Zhou .................... H04L 5/0023 |
| 2021/0329486 A1* | 10/2021 | Kadous .................. H04L 45/24 |

FOREIGN PATENT DOCUMENTS

| | | |
|---|---|---|
| WO | 2013/190168 | 12/2013 |
| WO | 2015/131500 | 9/2015 |

\* cited by examiner

| SSID | BSSID | Channel | RSSI (dB) | Total Attempts | Successes | Failures | Success Rate (%) |
|---|---|---|---|---|---|---|---|
| WirelessNet_1 | 7f:a4:3d:be:df:8c | 1 | -70 to -61 | 39 | 12 | 27 | 31 |
| WirelessNet_1 | 7f:a4:3d:be:df:8c | 1 | -60 to -51 | 19 | 7 | 12 | 37 |
| WirelessNet_1 | 7f:a4:3d:be:df:8c | 1 | -50 to -41 | 20 | 17 | 3 | 85 |
| WirelessNet_1 | 7f:a4:3d:be:df:8c | 6 | -70 to -61 | 16 | 1 | 15 | 7 |
| WirelessNet_1 | 7f:a4:3d:be:df:8c | 6 | -60 to -51 | 31 | 6 | 25 | 20 |
| WirelessNet_1 | 7f:a4:3d:be:df:8c | 6 | -50 to -41 | 32 | 17 | 15 | 54 |
| WirelessNet_1 | 54:7a:90:c9:a1:ee | 1 | -70 to -61 | 7 | 3 | 4 | 43 |
| WirelessNet_1 | 54:7a:90:c9:a1:ee | 1 | -60 to -51 | 6 | 5 | 1 | 84 |
| WirelessNet_1 | 54:7a:90:c9:a1:ee | 1 | -50 to -41 | 15 | 14 | 1 | 94 |
| WirelessNet_1 | 54:7a:90:c9:a1:ee | 11 | -70 to -61 | 9 | 3 | 6 | 34 |
| WirelessNet_1 | 54:7a:90:c9:a1:ee | 11 | -60 to -51 | 5 | 2 | 3 | 40 |
| WirelessNet_1 | 54:7a:90:c9:a1:ee | 11 | -50 to -41 | 37 | 7 | 30 | 19 |
| WirelessNet_2 | 0a:1d:77:84:b9:1f | 6 | -70 to -61 | 42 | 15 | 27 | 36 |
| WirelessNet_2 | 0a:1d:77:84:b9:1f | 6 | -60 to -51 | 50 | 27 | 23 | 54 |
| WirelessNet_2 | 0a:1d:77:84:b9:1f | 6 | -50 to -41 | 33 | 28 | 5 | 85 |
| WirelessNet_2 | 9d:de:c7:11:02:b2 | 6 | -70 to -61 | 16 | 3 | 13 | 19 |
| WirelessNet_2 | 9d:de:c7:11:02:b2 | 6 | -60 to -51 | 46 | 13 | 33 | 29 |
| WirelessNet_2 | 9d:de:c7:11:02:b2 | 6 | -50 to -41 | 34 | 25 | 9 | 74 |
| WirelessNet_3 | 44:a8:52:f0:f1:3d | 4 | -70 to -61 | 8 | 5 | 3 | 63 |
| WirelessNet_3 | 44:a8:52:f0:f1:3d | 4 | -60 to -51 | 41 | 36 | 5 | 88 |
| WirelessNet_3 | 44:a8:52:f0:f1:3d | 4 | -50 to -41 | 47 | 44 | 3 | 94 |
| WirelessNet_3 | 44:a8:52:f0:f1:3d | 9 | -70 to -61 | 46 | 4 | 42 | 9 |
| WirelessNet_3 | 44:a8:52:f0:f1:3d | 9 | -60 to -51 | 10 | 1 | 9 | 10 |
| WirelessNet_3 | 44:a8:52:f0:f1:3d | 9 | -50 to -41 | 21 | 3 | 18 | 15 |

FIG. 4

ESTABLISHING AND TERMINATING WIRELESS LINKS

CROSS-REFERENCE TO RELATED APPLICATIONS

This application is a continuation of and claims priority to U.S. patent application Ser. No. 17/457,872, filed on Dec. 6, 2021, which is a continuation of and claims priority to U.S. patent application Ser. No. 16/582,355, filed on Sep. 25, 2019, which is a continuation of and claims priority to International Serial No. PCT/US2018/065682, filed on Dec. 14, 2018, which claims priority to U.S. Provisional Ser. No. 62/599,370, filed on Dec. 15, 2017, the entire contents of each are hereby incorporated by reference.

BACKGROUND

Wireless communication devices are capable of connecting to wireless networks through access points that broadcast transmissions within range of the devices. Although access points are often fixed in location, end user wireless devices such as smartphones, tablets, and notebook computers are often mobile and frequently travel in and out of coverage areas of different access points and wireless networks. Additionally, even when a mobile device maintains its location for a period of time while connected to a particular wireless network, external events and environmental changes can result in fluctuations in the quality of the connection.

To manage these changing conditions, wireless communication devices can include connection managers that detect wireless networks or access points in proximity of the device, and that determine when to connect to a network or access point based on indications of the network's or access point's quality. For example, some wireless communication devices are configured to connect to an access point if the received signal strength of a transmission from the access point meets a pre-defined, static threshold. The connection manager can also select a particular network to connect with if several are detected in range of the device.

SUMMARY

This specification describes systems, methods, devices, and other techniques for managing connections between wireless communication devices and access points. The quality of a wireless connection that involves bidirectional communication between a wireless communication device and an access point depends both on the ability of the wireless communication device to successfully receive downlink transmissions from the access point, and on the ability of the access point to successfully receive uplink transmissions from the wireless communication device. However, when a wireless communication device assesses whether to make a connection with an access point that it has detected, information about the quality or range of the uplink is often not available to the wireless communication device. For example, if the downlink transmission power level of transmissions from an access point significantly exceeds the uplink transmission power level of transmissions from the wireless communication device, even though the quality of the uplink transmission would be low, the wireless communication device may initiate connection with the access point based on the wireless communication device detecting a relatively high received signal strength from the access point. As such, even if a connection is established between the wireless communication device and access point, there may be relatively little margin for fading and the performance of the connection may suffer.

This specification describes techniques for wireless communication devices to manage connections with access points (and wireless networks that correspond to the access points) in manners that can account for both uplink transmission quality and downlink transmission quality. The techniques can be applied when determining whether to initiate a connection with an access point, or if a connection has already been established, when determining whether to maintain the connection.

In some implementations, a wireless communication device is configured to increase the SNR required to receive uplink transmissions during the connection phase, thereby providing margin in the SNR that allows for fading that can potentially occur during the course of a wireless connection, by degrading the quality of transmissions from the wireless communication device to the access point when the wireless communication device attempts to establish the connection. The wireless communication device, for example, may reduce its transmission power, use a more complex modulation scheme, or both, during a connection procedure to establish a link with an access point. If the link can be established using the reduced uplink transmission quality, the wireless communication device may then increase the transmission power and/or use a more robust modulation scheme for transmissions once the link has been established, thereby providing margin for the uplink transmissions. In this way, the device can degrade the uplink transmission quality during the connection phase (e.g., by reducing the uplink transmission power and/or using a more complex modulation scheme), such that a higher level of SNR is required for the access point to successfully receive the transmission.

In some implementations, the wireless communication device is configured to determine specific entry criteria for connecting to different wireless networks, access points, and/or frequency channels. The device can also determine exit criteria for disconnecting as described further below. The entry criteria can be based on indications of the wireless communication device's (or other wireless communication devices') relative success in connecting to particular networks, access points and/or channels historically. For example, the wireless communication device may maintain a database that stores, for different networks, access points, and/or channels, rates at which the wireless communication device (or other wireless communication devices) have previously connected to the different networks, access points, and/or channels at each of multiple different downlink transmission quality levels. Additionally or alternatively, the database can be maintained on one or more servers remote from the wireless device. When the wireless communication device later detects an available network, access point, and/or channel, the wireless communication device can compare the downlink transmission quality level of transmissions from the detected network, access point, and/or channel to a threshold quality level for the detected network, access point, and/or channel, where the threshold quality level is based on the historical ability to connect to that network, access point, and/or channel with a minimally specified rate of success. For instance, the wireless communication device may elect to connect to a first access point for which a detected transmission has an RSSI (received signal strength indicator) of −70 dBm if the historical success rate at connecting to the first access point with RSSI of −70 dBm is sufficiently high, but may elect not to connect to a second access point for which a detected transmission has an RSSI of −70 dBm if the historical success rate at connecting to the second access point with RSSI of −70 dBm does not meet a minimally specified level. The wireless communication device may, in some examples, be configured to initiate connection to an access point if the downlink transmission has an RSSI that meets a pre-defined default RSSI, but may be configured to lower the default RSSI threshold if the connection history indicates a sufficiently high rate of success in connecting to that access point (e.g., on a particular wireless network and/or channel) at a low RSSI (e.g., at the default RSSI threshold). If the lowered threshold continues to permit high rates of success in connecting to the access point, the wireless communication device may maintain or further lower the threshold; otherwise, the threshold may revert back to the default RSSI threshold or even raised above the initial default threshold if needed to achieve a specified minimal connection success rate. In some implementations, the database may be indexed by user and network locations, and/or other context that indicates preferred networks and network performance at different days of the week, times of day, and whether the user/device is located indoors or outdoors.

Due to fading that can occur in a wireless connection between a wireless communication device and an access point, wireless communication devices can also be configured to monitor a health of the connection and to terminate the connection (e.g., and thereafter connect to a different access point or network that may provide better service) if the connection's performance deteriorates a sufficient amount over time. One factor that the wireless communication device may account for in determining whether to maintain or terminate a connection is the downlink transmission power level of transmissions from the access point. If the downlink transmission power level (e.g., as measured by the wireless communication device as RSSI of the downlink) falls below an exit power level threshold for a period of time, the wireless communication device may initiate a procedure to terminate the connection with the access point. However, evaluating only the downlink transmission power level may cause the wireless communication device to maintain a connection when the downlink power is sufficiently strong but the uplink power is not (e.g., due to differences in the transmission powers of the access point and the wireless communication device).

Therefore, in some implementations, a wireless communication device may determine exit criteria for terminating a wireless link that is based on both the downlink transmission quality (e.g., power level and/or modulation scheme) from the perspective of the wireless communication device and the uplink transmission quality from the perspective of the access point. The wireless communication device may set exit criteria for terminating the wireless communication device based on comparison of the downlink transmission quality and the uplink transmission quality. Thus, if a significant disparity exists between the uplink and downlink transmission qualities (e.g., if the RSSI of an uplink transmission measured by the access point is lower than the RSSI of a downlink transmission measured by the wireless communication device), the wireless communication device may adjust baseline exit criteria (e.g., may raise the downlink exit RSSI threshold) so that the wireless communication device terminates a connection if it can no longer provide an effective communication channel for the wireless communication device or access point in either direction of communication.

In some implementations, the wireless communication device may be unable to directly obtain information about the received signal strength of uplink transmissions at the access point or about other transmission quality parameters. In these instances, the wireless communication device may infer the quality of uplink transmissions received by the access point based on characteristics of downlink transmissions received from the access point that correspond to successful uplink transmissions. For example, if the wireless communication device transmits packets to the access point and receives acknowledgments indicating that the packets were successfully transmitted, the wireless communication device can measure one or more quality parameters of the transmissions containing the acknowledgments to estimate the access point's perception of the health of the wireless link. If the access point transmits with a lower modulation and coding scheme (e.g., $MCS_0$), then the wireless communication device can infer that the received signal strength of uplink transmissions at the access point is relatively low. Accordingly, the wireless communication device may adjust the exit criteria for terminating the wireless connection, such as by increasing an exit RSSI threshold. In some implementations, the device may transmit several packets to the access point, each with a different MCS. The device may then track which of those packets (and corresponding MCSs) are acknowledged, thereby providing the device an indication of the current uplink signal quality (e.g., the received signal strength of uplink transmissions at the access point).

The techniques described herein may, in some implementations and in certain instances, achieve one or more advantages. First, by degrading uplink transmission quality during a connection procedure relative to a baseline quality, a wireless communication device may ensure that any resulting connection will have additional margin to counteract fading in transmissions that may occur during the course of a wireless connection. Second, by adjusting the entry criteria for connecting to an access point based on historical information about downlink transmission quality levels that resulted in successful connections, a wireless communication device can increase the likelihood of successfully connecting to the access point at a later time (e.g., for particular wireless networks and/or on particular frequency channels) and reduce the likelihood of establishing poor quality connections. Third, by adjusting the exit criteria for initiating termination of an existing/ongoing wireless connection based on comparison of uplink and downlink transmission quality parameters, the wireless communication device may more effectively determine times to maintain or end the wireless connection. For example, rather than just measuring the received signal strength of a downlink transmission, which risks maintaining a poor connection in which the wireless communication device is in downlink range of the access point but the access point is not within uplink range of the wireless communication device, the exit threshold for the received signal strength of a downlink transmission can be increased if there is a disparity between the received signal strengths of the uplink and downlink transmissions. Fourth, the wireless communication device may select better performing access points to connect to by applying different entry criteria that are specific to individual access points.

Some implementations of the subject matter disclosed herein include, in a first aspect, computer-implemented methods involving actions for identifying, by a wireless communication device, an access point for a wireless network; initiating, by the wireless communication device, a connection procedure to establish a wireless connection between the wireless communication device and the access point, including: (i) selecting a degraded set of uplink transmission quality parameters that correspond to a higher signal-to-noise (SNR) ratio than a baseline set of uplink transmission quality parameters, and (ii) transmitting messages from the wireless communication device to the access point during the connection procedure according to the degraded set of uplink transmission quality parameters; and establishing the wireless connection between the wireless communication device and the access point as a result of completion of the connection procedure, despite the wireless communication device transmitting messages to the access point during the connection procedure according to the degraded set of uplink transmission quality parameters. The degraded set of uplink transmission quality parameters may be said to correspond to a higher signal-to-noise ratio (SNR) because messages transmitted according to those parameters may require a higher SNR in order to be successfully received.

These and other implementations can optionally include one or more of the following features.

The degraded set of uplink transmission quality parameters can include a reduced uplink power transmission level that is less than a baseline uplink power transmission level. Transmitting the messages from the wireless communication device to the access point during the connection procedure can include transmitting the messages at the reduced uplink power transmission level.

The degraded set of uplink transmission quality parameters can include a particular modulation scheme that is rated as more complex than a baseline modulation scheme, and transmitting the messages from the wireless communication device to the access point during the connection procedure can include transmitting the messages using the particular modulation scheme.

The degraded set of uplink transmission quality parameters can be assigned to a first modulation and coding scheme (MCS) index value, the baseline set of uplink transmission quality parameters can be assigned to a second MCS index value, and the first MCS index value assigned to the degraded set of uplink transmission quality parameters can correspond to a more complex modulation scheme than the second MCS index value assigned to the baseline set of uplink transmission quality parameters.

The methods can further include actions for identifying, by the wireless communication device, a second access point for a second wireless network; initiating, by the wireless communication device, a second connection procedure to establish a second wireless connection between the wireless communication device and the second access point, including: (i) selecting the degraded set of uplink transmission quality parameters that correspond to the higher signal-to-noise (SNR) ratio than the baseline set of uplink transmission quality parameters; and (ii) transmitting messages from the wireless communication device to the second access point during the second connection procedure according to the degraded set of uplink transmission quality parameters, wherein the wireless communication device fails to establish the second wireless connection between the wireless communication device and the second access point as a result of the second connection procedure.

The method can further include actions for determining a downlink transmission power level of the access point, wherein the baseline set of uplink transmission quality parameters are a default set of uplink transmission quality parameters that are mapped to the downlink transmission power level of the access point.

The methods can further include actions for, after establishing the wireless connection between the wireless communication device and the access point, reconfiguring the wireless communication device to cause the wireless communication device to transmit messages to the access point over the wireless connection according to the baseline set of uplink transmission quality parameters.

The wireless communication device can identify the access point by actively scanning for access points, including (i) transmitting a probe message from the wireless communication device and (ii) receiving at the wireless communication device a response to the probe message from the access point. Transmitting messages from the wireless communication device to the access point during the connection procedure according to the degraded set of uplink transmission quality parameters can include transmitting the probe message from the wireless communication device according to the degraded set of uplink transmission quality parameters.

The wireless communication device can identify the access point through passive scanning. Transmitting messages from the wireless communication device to the access point during the connection procedure according to the degraded set of uplink transmission quality parameters can include transmitting messages according to the degraded set of uplink transmission quality parameters during at least one of an authentication phase of the connection procedure or an association phase of the connection procedure.

The wireless communication device can be a mobile phone, a tablet computing device, a notebook computer, or a smartwatch.

The methods can further include actions for determining to initiate the connection procedure to establish the wireless connection between the wireless communication device and the access point based on a comparison of a downlink transmission power level of the access point to a threshold power level.

The wireless communication device can identify the access point for the wireless network through the connection procedure by transmitting multiple probe messages, and at least some of the probe messages can be transmitted according to different degraded sets of uplink transmission quality parameters. The wireless communication device can track responses received from the access point to assess a sufficiency of the degraded sets of uplink transmission quality parameters for communicating with the access point.

Some implementations of the subject matter disclosed herein include, in a second aspect, computer-implemented methods involving actions for identifying, by a wireless communication device, an access point for a wireless network; determining, by the wireless communication device, a downlink transmission power level of a transmission from the access point; identifying a threshold power level for initiating connection to the access point, the threshold power level based on a lowest downlink transmission power level for which the wireless communication device or another wireless communication device previously attempted to connect to the access point with at least a threshold rate of success; determining whether the downlink transmission power level of the transmission from the access point meets the threshold power level; and initiating, by the wireless device and in response to determining that the downlink transmission power level of the transmission from the access point meets the threshold power level, a connection procedure to establish a wireless connection between the wireless communication device and the access point.

Some implementations of the subject matter disclosed herein include, in a third aspect, computer-implemented methods for establishing a wireless connection between a wireless communication device and an access point for a wireless network; identifying, by the wireless communication device, one or more downlink transmission quality parameters of a first set of transmissions from the access point to the wireless communication device over the wireless connection; identifying, by the wireless communication device, one or more uplink transmission quality parameters of a second set of transmissions from the wireless communication device to the access point over the wireless connection; determining a difference between the one or more downlink transmission quality parameters and the one or more uplink transmission quality parameters; determining, based on the difference between the one or more downlink transmission quality parameters and the one or more uplink transmission quality parameters, a criterion for initiating termination of the wireless connection; determining whether a characteristic of the wireless connection between the wireless communication device and the access point meets the criterion for initiating termination of the wireless connection; and in response to determining that the characteristic of the wireless connection between the wireless communication device and the access point meets the criterion, initiating termination of the wireless connection.

These and other implementations can optionally include one or more of the following features.

The one or more downlink transmission quality parameters can include a downlink transmission power level of the first set of transmissions from the access point to the wireless communication device, and the one or more uplink transmission quality parameters can include an uplink transmission power level of the second set of transmissions from the wireless communication device to the access point.

The downlink transmission power level of the first set of transmissions can be measured by the wireless communication device as a received signal strength of the first set of transmissions; and the uplink transmission power level of the second set of transmissions can be measured by the access point as a received signal strength of the second set of transmissions.

Identifying the one or more uplink transmission quality parameters of the second set of transmissions can include requesting, by the wireless communication device, that the access point provide the wireless communication device with data that indicates the one or more uplink transmission quality parameters.

The criterion for initiating termination of the wireless connection can include the downlink transmission power level of transmissions from the access point to the wireless communication device not meeting a threshold power level.

The threshold power level can be an adjusted threshold power level, and determining the criterion for initiating termination of the wireless connection can include generating the adjusted threshold power level by applying an offset to a baseline threshold power level, the offset based on a difference between the downlink transmission power level of the first set of transmissions and the uplink transmission power level of the second set of transmissions.

The one or more downlink transmission quality parameters can include a first modulation scheme of the first set of transmissions from the access point to the wireless communication device, and the one or more uplink transmission quality parameters can include a second modulation scheme of the second set of transmissions from the wireless communication device to the access point.

Identifying the one or more downlink transmission quality parameters of the first set of transmissions can include identifying a modulation and coding scheme (MCS) index value of the first set of transmissions, the first modulation scheme being assigned to the MCS index value of the first set of transmissions; and identifying the one or more uplink transmission quality parameters of the second set of transmissions can include identifying an MCS index value of the second set of transmissions, the second modulation scheme being assigned to the MCS index value of the second set of transmissions.

The criterion for initiating termination of the wireless connection can include a downlink transmission power level of transmissions from the access point to the wireless communication device not meeting a threshold power level. The methods can further include actions for determining the threshold power level based on an estimated difference in received signal strengths between the first set of transmissions at the wireless communication device and the second set of transmissions at the access point, the estimated difference determined using at least the MCS index value of the second set of transmissions.

In response to determining that the characteristic of the wireless connection between the wireless communication device and the access point does not meet the criterion, the wireless communication device can be configured to maintain the wireless connection for a period of time, rather than initiating termination of the wireless connection.

Some implementations of the subject matter disclosed herein include, in a fourth aspect, computer-implemented methods involving actions for establishing a wireless connection between a wireless communication device and an access point for a wireless network; identifying uplink transmissions that were successfully transmitted from the wireless communication device to the access point; determining downlink transmission power levels for downlink transmissions that correspond to the uplink transmissions that were successfully transmitted from the wireless communication device to the access point; identifying a minimally acceptable uplink transmission quality level; determining a threshold downlink received power level for initiating termination of the wireless connection between the wireless communication device and the access point, the threshold downlink power level based on the downlink transmission power levels at the receiver for one or more of the downlink transmissions that correspond to one or more of the uplink transmissions that were successfully transmitted from the wireless communication device to the access point at the minimally acceptable transmission quality level; and using the threshold downlink power level to determine whether to initiate termination of the wireless connection between the wireless communication device and the access point.

Each of the computer-implemented methods described herein may additionally be embodied as a computer program comprising program instructions executable by data processing apparatus in one or more wireless devices or other types of computers. The computer program may be stored on one or more computer-readable media. For example, one or more computer-readable media can be encoded with instructions that, when executed by data processing apparatus (e.g., one or more processors), cause the data processing apparatus to perform any of the computer-implemented methods described herein. In some implementations, the computer-readable media and the data processing apparatus are part of a computing system.

The details of particular implementations are set forth in the drawings and the detailed description below. Additional features and advantages will be apparent to those of ordinary skill in the field to which the subject matter pertains.

DESCRIPTION OF DRAWINGS

FIG. 4 is a table showing history of a wireless communication device's successful and failed attempts to connect to various wireless networks on certain access points and on certain channels.

DETAILED DESCRIPTION

This specification generally describes systems, methods, devices, and other techniques for establishing and monitoring wireless connections (also referred to as "wireless links") between wireless communication devices and access points that provide access to wireless networks. Wireless communication devices may apply these techniques to selectively establish wireless connections with access points that are more likely to provide reliable, high quality performance. In some implementations, wireless communication devices may further apply these techniques to determine appropriate times to terminate an existing wireless connection, e.g., in favor of connecting to an alternate access point that may provide a higher quality connection.

Figure 1:
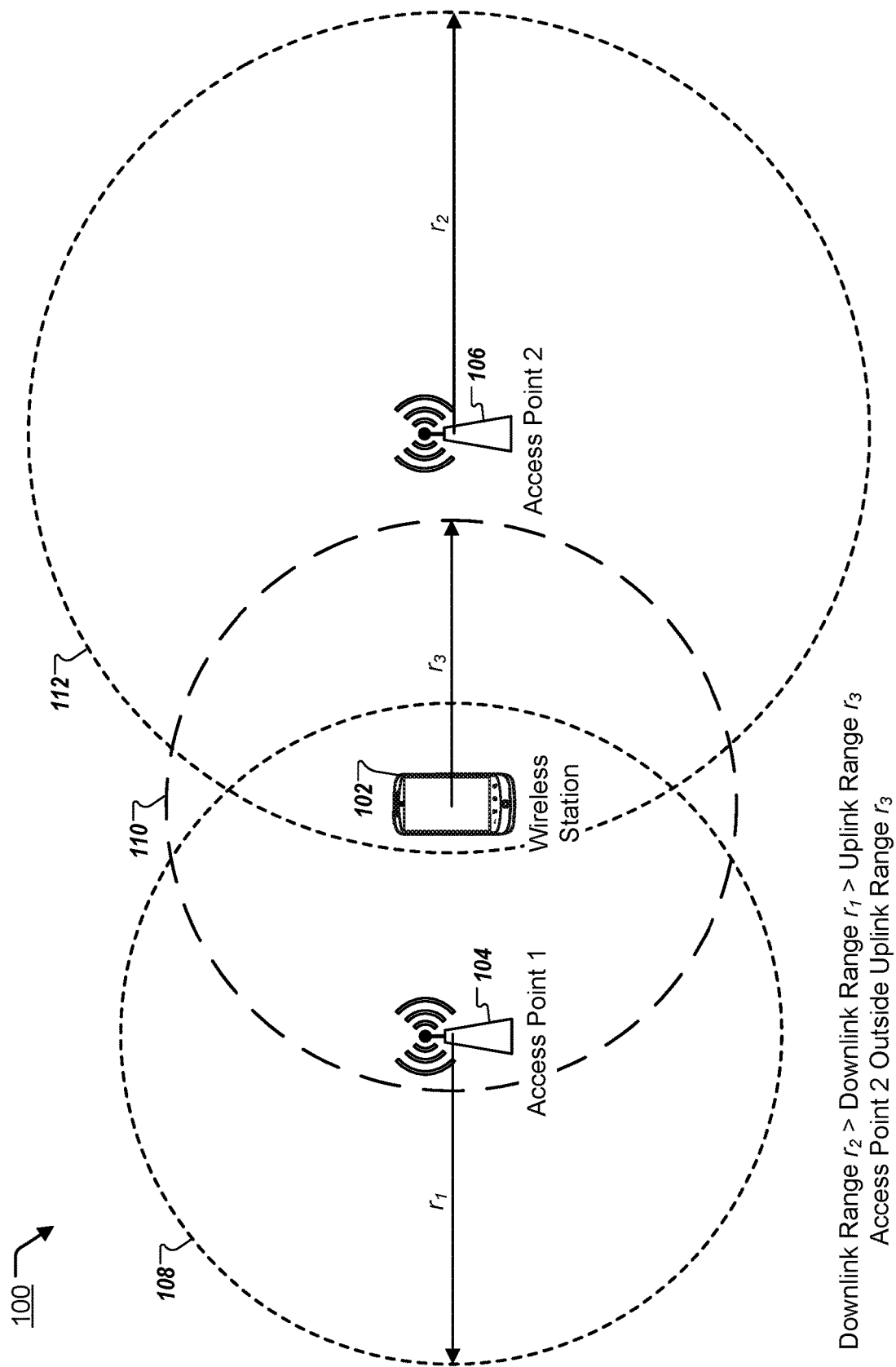
FIG. 1 is a conceptual diagram illustrating disparities among the transmission ranges of a wireless communication device and a pair of access points.

Referring to FIG. 1, a conceptual diagram is shown of a wireless environment 100 having a wireless communication device 102 and a pair of access points 104, 106 in proximity of the wireless communication device 102. The wireless communication device 102 can be any suitable wireless-enabled device that is capable of wirelessly connecting to an access point to access a network. The wireless communication device 102 can be, for example, a smartphone, a tablet computing device, a notebook computer, a desktop computer, a wireless network interface card, a smartwatch, a wireless-enabled television or set top box, an automotive wireless system, or other suitable devices. The access points 104, 106 can each be any suitable wireless networking device that allows wireless communication devices, e.g., wireless communication device 102, to connect to a network via a wireless connection to the access point 104 or 106. In some implementations, the access points 104, 106 are integrated in a wireless router. In other implementations, the access points 104, 106 are distinct from a wireless router.

The access points 104, 106 may each provide access to a wired network, such as the Internet or an intranet of an organization. Generally, each access point 104, 106 implements a wireless network by itself or in coordination with one or more additional access points. For example, the access points 104, 106 may be configured to implement IEEE 802.11 (WIFI) wireless local area networks, or may be part of 2G, 3G, 4G (e.g., LTE), or 5G wideband wireless area networks along with additional access points. The wireless communication device 102 may be configured to communicate with the access points 104, 106 over corresponding wireless networks (e.g., IEEE 802.11 WIFI networks, or 2G, 3G, 4G, or 5G networks). Although only two access points 104, 106 are shown in FIG. 1, any number of access points (e.g., 3, 4, 5, 6 or more) may be located in the wireless environment 100, in such proximity that the device 102 can detect their presence. Two or more of the access points, e.g., access points 104 and 106, may be part of the same wireless network or different wireless networks.

Wireless communication device 102 and access points 104, 106 each have receiver portions and transmitter portions for receiving and transmitting radio frequency (RF) transmissions, respectively. With respect to the transmitter portions, the wireless communication device 102 is configured to broadcast uplink RF transmissions and to detect/receive downlink RF transmissions. Conversely, the access points 104, 106 are each configured to broadcast downlink RF transmissions and to detect/receive uplink RF transmissions. However, the wireless communication device 102 and access points 104, 106 may all have different transmission power levels which provide different transmission ranges from each other. For instance, FIG. 1 shows that access point 104 has a moderately sized coverage area 108 with radius $r_1$, access point 106 has a relatively larger coverage area 112 with radius $r_2$ reflecting a higher transmission power level, and wireless communication device 102 has a relatively smaller coverage area 110 with radius $r_3$ reflecting a lower transmission power level (this representation assumes equivalent receiver sensitivities among the devices 102, 104, 106). As a consequence of these differences in transmission power levels and the location of wireless communication device 102 relative to access points 104 and 106, the wireless communication device 102 is within the respective downlink coverage areas 108, 112 of access points 104, 106, but only the first access point 104 is within the uplink coverage area 110 of wireless communication device 102. The second access point 104 is located a farther distance from the wireless communication device 102 beyond the effective uplink transmission range $r_3$ of the wireless communication device 102. As a result, the wireless communication device 102 may be capable of receiving transmissions with sufficient quality to permit reliable downlink communications from both access points 104 and 106, but only the first access point 104 in in range to permit reliable uplink communications from wireless communication device 102. Nonetheless, the downlink power transmission levels measured by wireless communication device 102 from both access points 104 and 106 may be the same (or transmissions from the second access point 106 may even have greater received signal strength at the wireless communication device 102). For example, because of variations in access point transmission power levels, at the edge of the uplink range, the access point beacon RSSI could vary by more than 10 dB. As described with respect to FIGS. 2-4, the wireless communication device 102 can take action to selectively connect to access points that are more likely to provide reliable connections and margin for fading in both downlink and uplink communications, rather than relying on a static threshold of downlink transmission power in determining whether to attempt connection to an access point.

Figure 2:
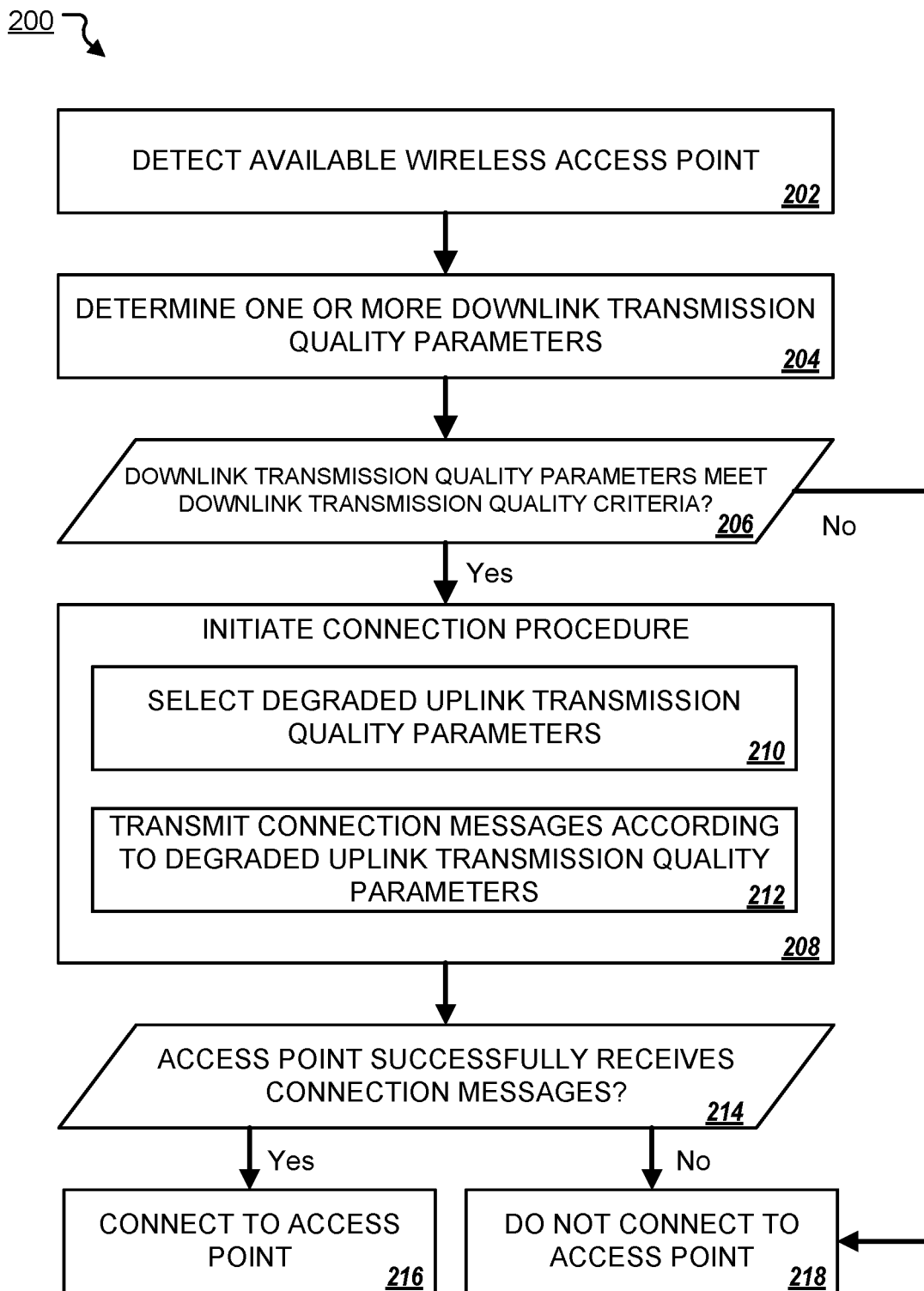
FIG. 2 is a flowchart of an example process for establishing a wireless link between a wireless communication device and an access point using degraded uplink transmissions during a connection procedure.

FIG. 2 is a flowchart of an example process 200 for establishing a wireless connection between a wireless communication device and an access point. In general, a wireless communication device can be configured to make a connection to an access point in a manner that provides margin for signal-quality fading in uplink transmissions by degrading the quality of transmissions from the wireless communication device to the access point while the wireless communication device attempts to establish the connection. The wireless communication device, for example, may use a transmission power level that is lower than a baseline, use a more complex modulation scheme, or both, during a connection procedure to establish a link with an access point. If the link can be established using the reduced uplink transmission quality, the wireless communication device may then increase the transmission power and/or use a more robust modulation scheme for transmissions once the link has been established, thereby providing margin for the uplink transmissions.

In more detail, at stage 202, a wireless communication device (e.g., wireless communication device 102) detects an available access point (e.g., access point 104 or 106) for a wireless network. The wireless communication device can detect the access point by scanning its environment passively or actively. For active scanning, the wireless communication device may first announce its presence by broadcasting a message and monitoring for a response from any access points in uplink range of the wireless communication device. For passive scanning, the access point may periodically transmit a beacon that allows any wireless communication devices in downlink range of the access point to discover the access point by listening for such beacons on pre-defined frequency channels.

At stage 204, the wireless communication device determines one or more quality parameters of a downlink transmission from the detected access point. The downlink transmission may be a beacon from the access point that is detected during passive scanning, a transmission received in response to a probe message from the wireless communication device during active scanning, or any other transmission that the wireless communication device detects from the access point before a link is established with the access point. The quality parameters of a transmission include any characteristic of the transmission that relates to the ability of the wireless communication device to successfully receive and interpret the transmission, such as a signal-to-noise ratio (SNR) of the transmission, a power level of the transmission, a modulation scheme of the transmission, a number of spatial streams provided in the transmission, a coding rate of the transmission, and a guard interval of the transmission. In some implementations, a transmitting device is configured broadcast transmissions according to a defined set of transmission quality parameters, and to adjust the parameters as needed to ensure reliable throughput of data to the receive device. When there is greater interference or noise, the transmitting device can select higher quality transmission parameters to make its transmissions more robust against ill effects of the interference or noise. In other words, the quality of a transmission is generally inversely related to its corruptibility as a result of interference or noise. For example, binary phase shift keying (BPSK) may be deemed a higher quality modulation scheme than quadrature phase shift keying (QPSK) because BPSK transmissions are more impervious to noise than QPSK despite the lower throughput of BPSK. As another example, 16-quadrature amplitude modulation (QAM) provides lower data throughput but, for the purpose of this specification, is deemed to have higher quality than 64-QAM since 16-QAM is more impervious to noise.

Similarly, a higher transmission power level generally corresponds to a higher transmission quality because it improves the SNR of a transmission at the receiver. In this specification, the power level of a transmission generally refers to the strength of the transmission at the receiving device. Transmission power levels are commonly measured at the receiving device, for example, in terms of a received signal strength indicator (RSSI). The power level of a transmission fades as it propagates through a medium and is inversely proportional to the distance from the transmitter. Therefore, the transmission power level measured at the receiver will typically be less than the transmission power level measured at the transmitter. However, a transmitting device can be configured to select different transmission power levels, and thus in some contexts as described herein the transmission power level can refer to the transmission power level from the perspective of the transmitter.

In some implementations, the wireless communication device can determine a modulation and coding scheme (MCS) index value of the transmission from the access point as an indication of the quality of the transmission. The IEEE 802.11 protocol defines a series of MCS index values that each represent a different combination of transmission quality parameters. Generally, higher MCS index values indicate lower quality transmissions that provide higher data throughput but require a higher SNR to be successfully received. For example, $MCS_0$ indicates a transmission with one spatial stream, modulated using BPSK, with a coding rate of ½. $MCS_1$ is a somewhat lower quality, higher throughput transmission with one spatial stream, modulated using QPSK, with a coding rate of ½. In some implementations, the wireless communication device can use the MCS index value of a received transmission, RSSI, or both, as an indication of the quality of the transmission.

At stage 206, the wireless communication device compares the observed downlink transmission quality of the transmission from the access point to one or more entry criteria for initiating connection with access point. The entry criteria can include thresholds for one or more transmission quality parameters, such as a minimally acceptable downlink transmission power level (e.g., a threshold RSSI value). If the observed transmission quality of the transmission from the access point satisfies the entry criteria, then the wireless communication device may initiate a connection procedure to establish a wireless link with the access point (stage 208). If the observed transmission quality of the transmission from the access point does not satisfy the entry criteria, then the wireless communication device may elect not to attempt connection with the access point.

As mentioned, at stage 208, the wireless communication device can initiate a connection procedure to establish a wireless link with the access point. The wireless communication device selects a set of degraded uplink transmission quality parameters to apply during the connection procedure (210), and then configures the transmitter portion of the wireless communication device to use the degraded parameters in uplink transmissions during the connection procedure (212). The degraded uplink parameters have lower quality than a baseline set of parameters, in that transmissions generated using the degraded parameters require a higher SNR to be successfully received by the access point. For example, the wireless communication device may throttle the transmission power level of uplink transmissions during the connection procedure from a baseline (e.g., maximum) power level that the wireless communication device is configured to use after (and if) the connection procedure completes and a wireless link is successfully established. Additionally or alternatively, during the connection procedure the wireless communication device may use a more complex modulation scheme (e.g., QPSK rather than BPSK) that requires a higher SNR to be successfully received by the access point. If a connection is later established, the wireless communication device may revert to higher quality parameters such as broadcasting with higher transmission power levels and/or applying a less complex modulation scheme. In this way, the wireless communication device can proactively take measures to provide a margin of SNR in uplink transmissions from the wireless communication device after a link is established, by providing lower quality transmissions while the wireless communication device attempts to connect to the access point.

At stage 214, if the access point is able to successfully receive degraded uplink transmissions during the connection procedure and the procedure successfully completes, then a wireless link is established and the wireless communication device connects to the access point (216). However, if the access point is unable to successfully receive uplink transmissions from the wireless communication device given their degraded quality, then no link will be established and the wireless communication device does not connect to the access point (218).

In some implementations, after establishing a connection to the access point, the wireless communication device is configured to initially broadcast uplink transmissions using at least one improved transmission quality parameter than was used during the connection procedure when the communication device used at least one degraded transmission quality parameter. The first uplink transmission that occurs after a link is established, for example, can have a lower MCS index value and/or a higher power level than was applied during the connection procedure, so that the quality of the initial uplink transmission in the link is higher than the quality of a degraded uplink transmission occurred during the connection procedure. In some implementations, the wireless communication device is configured to initially generate uplink transmissions upon establishing a link with an access point using at least one improved transmission quality parameter without regard to the downlink transmission power level, other downlink transmission quality parameters, or other information about the quality of the link. For example, the wireless communication device may broadcast uplink transmissions at less than full power during the connection procedure, and then be configured to transmit the first uplink transmission upon establishing the link at full power. The device may subsequently adjust the transmission quality parameters of uplink transmissions based on information about the quality of the link, including quality parameters of uplink and/or downlink transmissions.

The degraded uplink transmissions can be applied during the entire connection procedure or only for certain messages transmitted during the connection procedure. In some implementations, the wireless communication device degrades probe messages during active scanning. If no response is received from an access point given the degraded probe message, then the wireless communication device does not detect the access point or further attempt connection. In some implementations, the wireless communication device degrades additional messages after an access point is detected, whether as a result of active or passive scanning.

Figure 3:
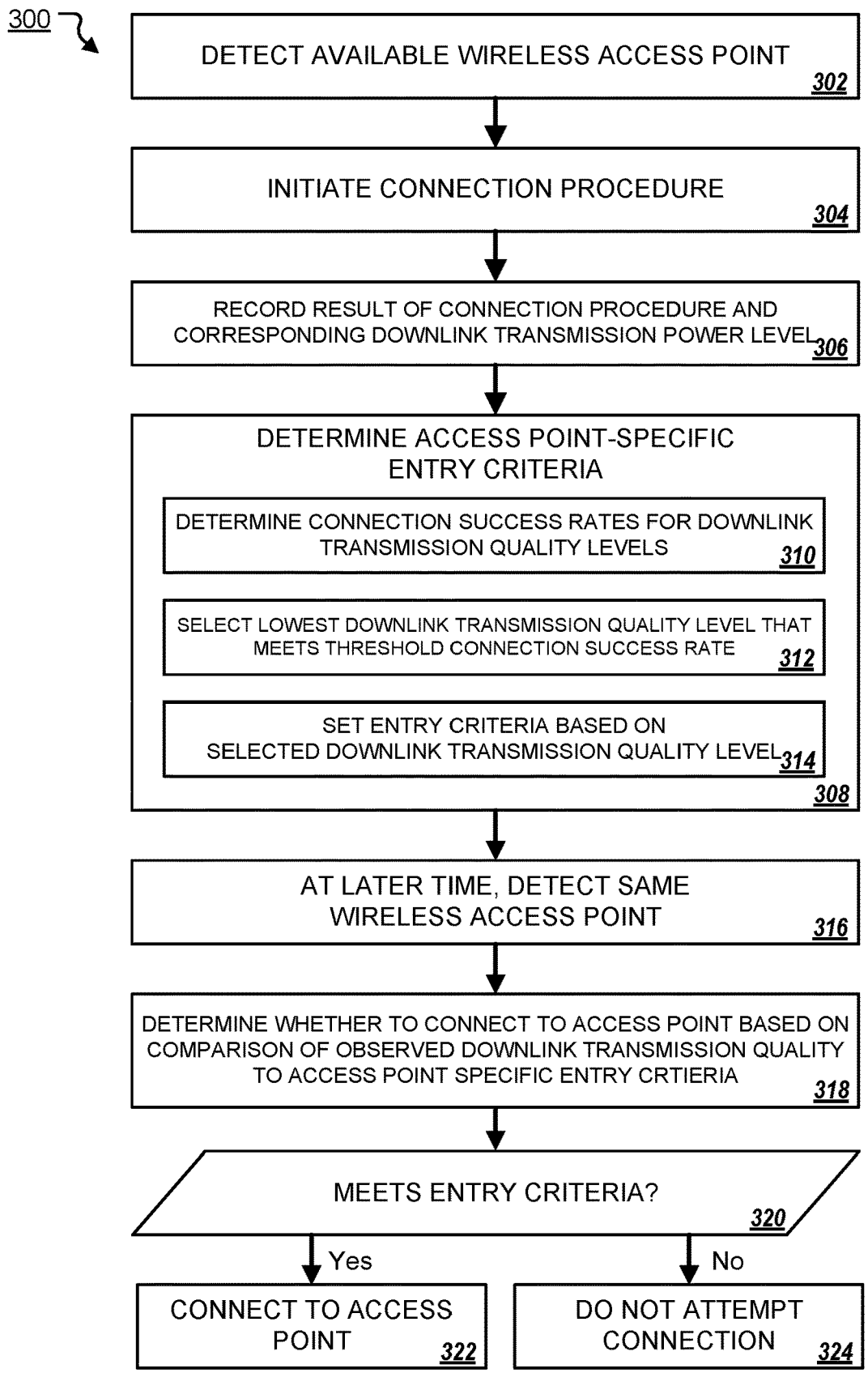
FIG. 3 is a flowchart of an example process for generating and applying access point, network, and/or channel-specific entry criteria for a wireless communication device to connect to the access point, network, and/or channel.

Turning to FIG. 3, a flowchart is shown of an example process 300 for determining access-point specific entry criteria for a wireless communication device to connect to particular access points. In general, access-point specific criteria can be generated based on indications of one or more wireless communication devices' historical rates of success in connecting to different access points with different downlink transmission qualities. The entry criteria for a particular access point can then be set as or based on the quality of downlink transmissions from the access point that have historically provided at least a threshold rate of success connections. In some implementations, the entry criteria may be relaxed (e.g., an RSSI threshold lowered) for a particular access point if the wireless communication device achieves a sufficiently high rate of success in establishing a reliable connection with the access point at the current entry threshold. It is noted that although FIG. 3 and the discussion herein refers by example to access-point specific entry criteria, some implementations involve determination of individualized entry criteria for particular wireless networks that include one or more access points, and some implementations involve determination of specific entry criteria for different frequency channels of individual access points and/or wireless networks.

In more detail, at stage 302, a wireless communication device (e.g., wireless communication device 102) detects an available access point (e.g., access point 104 or 106) for a wireless network. The wireless communication device can detect the access point by scanning its environment passively or actively. For active scanning, the wireless communication device may first announce its presence by broadcasting a message and monitoring for a response from any access points in uplink range of the wireless communication device. In some active scanning implementations, the device can announce its presence by transmitting probe request frames. The probe request frames can be transmitted multiple times, with each instance of the probe request being transmitted at a different power level and/or different MCS. The probe requests can each have a unique identifier (e.g., a sequence number), and can also be sent with a different (randomized) MAC address so that the access point receiving the multiple probe requests does not recognize that the probe requests each originate from the same physical device. The access point can then respond separately to each of the probe requests. From these responses (or expected responses if a response is not received), the wireless device can determine which particular ones of the probe response messages the access point responded to and can identify the corresponding transmission powers and/or MCS levels of the probe requests that prompted these responses from the access point. The wireless device can then estimate the uplink signal quality based on the responses from the access point. For passive scanning, the access point may periodically transmit a beacon that allows any wireless communication devices in downlink range of the access point to discover the access point by listening for such beacons on pre-defined frequency channels.

At stage 304, the wireless communication device determines that it should attempt to connect to the detected access point and initiates a connection procedure to establish a wireless link with the access point. The determination to initiate the connection procedure can result from identifying that a quality of a beacon or other downlink transmission from the access point satisfies pre-defined entry criteria for connecting to an access point. Initially, before historical information is available indicating the wireless communication device's previous experiences and success in connecting to various access points, the wireless communication device may use default entry criteria. The default criteria may later be replaced or adjusted by access-point specific criteria as the wireless communication device gathers more observations of successful and failed attempts connecting to wireless communication devices under different conditions and different downlink transmission qualities.

At stage 306, the wireless communication device stores a result of the connection procedure and an indication of the downlink transmission quality of one or more transmissions from the access point. The downlink transmissions for which the quality is measured and recorded can be transmissions corresponding to a time when the wireless communication device detected the access point and/or transmissions that occurred during the connection procedure. In some implementations, the result of the connection procedure is a binary classification, e.g., successful connection (link established) or failed connection (link not established). For example, the wireless communication device may generate a database entry for a connection attempt that indicates the result of the attempt (e.g., success or failure) and the downlink transmission power level (e.g., RSSI level) of one or more downlink transmissions transmitted during the connection procedure. In some implementations, a cumulative success and/or failure rate can be maintained in the database that indicates the percentage of connection attempts of the wireless communication device and/or other wireless communication devices that have been successful or failed when attempting connection with the particular access point (or particular wireless network and/or a particular channel on a particular access point) over a past period of time. The cumulate success or failure rate can be updated based on the result of the latest attempt to initiate connection with the access point that was performed at stage 304.

In some implementations, a connection attempt is classified as a success if a connection procedure completes and results in a link being established between the wireless communication device and access point. If no link can be established, the connection attempt is deemed to have failed. In some implementations, a connection attempt is classified as a success only if a link is established and the link is maintained for a least a threshold amount of time (e.g., to ensure the link does not immediately fail despite having been established for a period of fleeting amount of time). If the link fails before the threshold amount of time has passed, the connection is deemed to have failed. In some implementations, a connection attempt is classified as a success only if a link established and the quality of uplink and/or downlink transmissions meets a threshold quality for at least a threshold amount of time.

At stage 308, the wireless communication device or another system determines access-point specific entry criteria for connecting to the access point (or for connecting to a particular wireless network to which the access point belongs and/or for connecting to the access point on particular frequency channel). In particular, the system determines, for each of multiple downlink transmission quality levels, the cumulate success rate (or failure rate) of the wireless communication device and/or other wireless communication devices connecting to the particular access point when the particular downlink transmission quality level was observed (310). The success rates can be determined from the above-mentioned database entries that map results of connection attempts to downlink transmission quality levels. In some implementations, success rates are determined for specific downlink transmission qualities (e.g., −60 dB, −55 dB power levels). In other implementations, success rates are determined for ranges of transmission qualities (e.g., −70 to −61 dB, −60 to −51 dB power levels). The system then uses a selection criterion to select one or more downlink transmission quality levels from which to set the entry criteria for the access point (312). In some implementations, the system selects the lowest downlink transmission quality level that is mapped to a sufficiently high historical connection success rate (e.g., as indicated by a threshold success rate). The selected downlink transmission quality level can then be used to establish the access-point specific entry criteria for the access point (314). In some implementations, the entry criteria is or includes a threshold downlink transmission power level (e.g., RSSI level), and the threshold is set as or is based on a selected downlink transmission power level, such as the lowest transmission power level that is mapped to a threshold connection success rate for the access point.

To illustrate, FIG. 4 shows an example database table storing information about a wireless communication device's past attempts to connect to various access points on different networks and channels. Each row presents connection success information for a particular combination of SSID, BSSID, frequency channel, and RSSI range. The SSID ("service set identifier") column for an given entry indicates the wireless network to which the wireless communication device attempted to connect; the BSSID column indicated the MAC address of the particular access point to which the wireless communication device attempted to connect; the channel column indicates the frequency channel on which the connection attempt was made; and the RSSI column indicates a range of RSSI levels that encompasses the RSSI level of a corresponding downlink transmission from the access point for the connection attempt. According to the techniques described with respect to FIG. 3, a wireless communication device or other system can determine a threshold entry RSSI level for a particular SSID/BSSID/channel combination by selecting the lowest RSSI range corresponding to a minimally acceptable (e.g., threshold) connection success rate. For example, if the threshold connection success rate is 75-percent, for "WirelessNet_1", access point '7f:a4:3d:be:df:8c', channel 1, the system may select an RSSI level from the range −50 to −41 dB as the entry RSSI threshold. In some implementations, the selected RSSI threshold is the lowest signal strength in the range (e.g., −50 dB), the highest signal strength in the range (e.g., −41 dB), or an intermediate value. In some implementations, the system sets the RSSI threshold from a range that provides the highest success rate, whether or not the success rate meets a threshold. Different RSSI threshold can be maintained for different SSID/BSSID/channel combinations. In some implementations, the system periodically (or otherwise from time to time) updates the RSSI thresholds and/or other entry criteria based on more recent indications of successful and failed connection attempts.

In some implementations, a wireless communication device or other system can be configured to dynamically adjust entry criteria for the wireless communication device to initiate connection with a particular access point. For example, the wireless communication device may adopt an initial (e.g., default) set of entry criteria. If, over time, the wireless communication device demonstrates sufficiently high connection success rate with an access point using the initial set of entry criteria, than the entry criteria may be relaxed (e.g., a minimum downlink RSSI threshold may be lowered). If the relaxed entry criteria continues to yield a sufficiently high connection success rate with the access point, then the wireless communication device can relax the entry criteria even further. If, on the other hand, the relaxed entry criteria results in too many failed connections (e.g., the connection success rate fails to meet a specified threshold), then the entry criteria may be reverted upward again.

Referring again to FIG. 3, after the access point-specific entry criteria has been determined, at a later time when the wireless communication device has an opportunity to connect to the access point, the wireless communication device may measure one or more downlink transmission quality parameters and compare them to parameters required by the entry criteria (stage 318). At stage 320, the wireless communication device then determines if the quality of the downlink transmission from the access point meets the entry criteria. In some implementations, determining if the downlink transmission quality meets the entry criteria includes comparing the downlink transmission power level of a transmission from the access point (e.g., the RSSI of a beacon or probe response) a threshold power level (e.g., a threshold RSSI level). At stage 322, the wireless communication device establishes a connection with the access point if the entry criteria is met. Alternatively, the wireless communication device may not establish a connection with the access point if the entry criteria is not met (stage 324).

Figure 5:
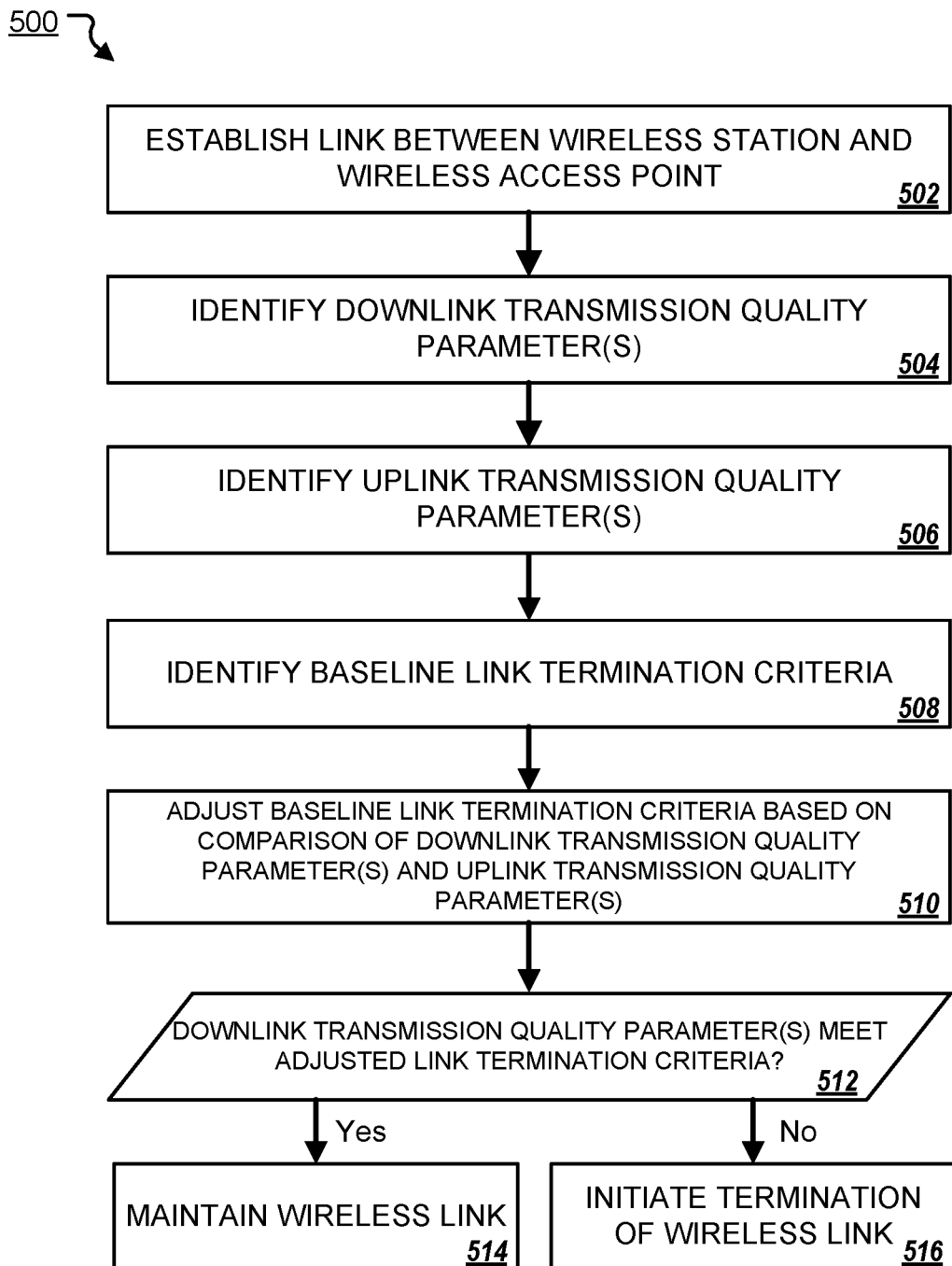
FIG. 5 is a flowchart of an example process of a wireless communication device adjusting exit criteria for terminating a wireless transmission based on uplink and downlink transmission qualities.

FIG. 5 is a flowchart of an example process 500 for a wireless communication device to set exit criteria for terminating a wireless transmission based on information about the relative qualities of uplink and downlink transmissions. In general, after a link has been established between a wireless communication device and an access point, the wireless communication device can monitor the health or quality of the link. If the quality of the link deteriorates to a point that the wireless communication device has difficulty either successfully receiving downlink transmissions or successfully transmitting uplink transmissions, the wireless communication device may initiate a termination procedure. Initiating the termination procedure can involve searching for other access points to connect to in lieu of maintaining a link with the currently connected access point, and can sometimes result in the immediate termination of the link. Link quality can fluctuate as the wireless communication device moves relative to the access point, and will tend to degrade as a function of the wireless communication device's distance to the access point. Other obstacles and interference can also occur from external conditions. However, to reduce the likelihood of the wireless communication device maintaining a poor quality link where the downlink transmission quality is acceptable but the uplink transmission quality is not, the wireless communication device may perform the process 500 to further account for the uplink transmission quality in determining exit criteria for a link.

At stage 502, the wireless communication device establishes a wireless link (connection) with an access point. Once the link is established, the wireless communication device monitors the health or quality of the link. On a constant or frequent basis, for example, the wireless communication device can measure a quality of downlink transmissions from the access point (stage 504) and identify a quality of uplink transmissions received by the access point (stage 506). In some implementations, for example the wireless communication device determines quality parameters of uplink and downlink transmissions during the course of a connection, such as signal-to-noise ratio (SNR) of the transmissions, power levels of the transmissions, modulation schemes of the transmissions, number of spatial streams provided in the transmissions, coding rates of the transmissions, guard intervals of the transmissions, or a combination of these. The wireless communication device is typically able to directly determine the quality of downlink transmissions since they are received by the wireless communication device. For example, the wireless communication device can determine an RSSI level of a downlink transmission and/or an MCS index value of the downlink transmission. However, the wireless communication device may not be in position to directly measure some uplink quality parameters such as the received signal strength of an uplink transmission at the access point. As such, the access point can measure the received signal strength of an uplink transmission and transmit an indication of the measured signal strength for the uplink transmission to the wireless communication device, either autonomously or on request from the wireless communication device. In some implementations in which the wireless link is based on the IEEE 802.11 protocol, the wireless communication device may leverage messages that were originally purposed for beamforming techniques to cause the access point to provide an indication of the received signal strength of the uplink transmission to the wireless communication device. Other uplink quality parameters such as modulation scheme, coding rate, and guard interval are set by the wireless communication device's transmitter and are thus known to the wireless communication device.

In some implementations, the wireless communication device sets the exit criteria for the link by adjusting baseline link termination criteria using information about the uplink and downlink transmission qualities. At stage 508, the wireless communication device identifies the baseline termination criteria. As an example, the baseline termination criteria can include a pre-defined static downlink transmission power threshold (e.g., an RSSI level). Absent adjustment, the wireless link may be terminated if the measured downlink transmission power level of downlink transmissions from the access point do not meet this static threshold for a period of time. The baseline termination criteria can additionally or alternatively include other quality factors, such as modulation criteria, coding rate criteria, SNR threshold, or a combination of these and others.

At stage 510, the wireless communication device compares the qualities of the monitored downlink transmissions and uplink transmissions. If a disparity exists between the uplink and downlink qualities, the wireless communication device can adjust the exit criteria based on the disparity. In some implementations, the wireless communication device determines a difference between the transmission power levels of the uplink and downlink transmissions (e.g., a difference in the RSSI levels of downlink and uplink transmissions), and then applies the difference as an offset to the pre-defined, static downlink transmission power threshold. For example, an adjusted downlink transmission power threshold can be determined by adding to the baseline threshold an offset, where the offset equals the downlink transmission power level minus the uplink transmission power level. Accordingly, if the received signal strength of uplink transmissions is less than the received signal strength of downlink transmissions, the downlink transmission power threshold can be increased by the difference thereby making the wireless communication device more sensitive to terminating an existing link.

In some implementations, the wireless communication device determines a difference between the modulation and coding scheme (MCS) index values of the monitored uplink and downlink transmissions, and adjusts the downlink transmission power threshold that forms or is part of the exit criteria based on this difference. Each MCS index value may be mapped to a respective SNR value. The wireless communication device can then adjust the downlink transmission power threshold by an amount that equalizes a difference in the SNR values for the uplink and downlink transmissions. For example, if during the course of a connection the wireless communication device broadcasts uplink transmissions using $MCS_1$ but the access point broadcasts downlink transmissions using $MCS_0$, the wireless communication device increase the downlink transmission power level threshold to account for the fact that the access point is using a higher quality modulation and coding scheme. This technique can be beneficial to adjust the threshold for terminating a link when the wireless communication device is unable to access the measured received signal strength data of uplink transmission from the access point.

At stage 512, the wireless communication device determines whether the quality of downlink transmissions meets the adjusted exit criteria, e.g., by comparing the RSSI levels of one or more downlink transmissions to an adjusted RSSI threshold. If the quality of the downlink transmission meets (e.g., equals or exceeds) the adjusted exit criteria, such as the measured RSSI level of the downlink transmissions meeting the adjusted RSSI threshold, then the wireless communication device elects to maintain the wireless link 514. However, if the quality of the downlink transmission does not meet the adjusted exit criteria, then the wireless communication device can elect to initiate termination of the wireless link (stage 516). In some implementations, the wireless communication device only terminates the wireless link if an alternative access point or network is available that would provide better performance than the current access point. In other implementations, the wireless communication device immediately terminates the wireless link regardless of whether improved links could be established.

Figure 6:
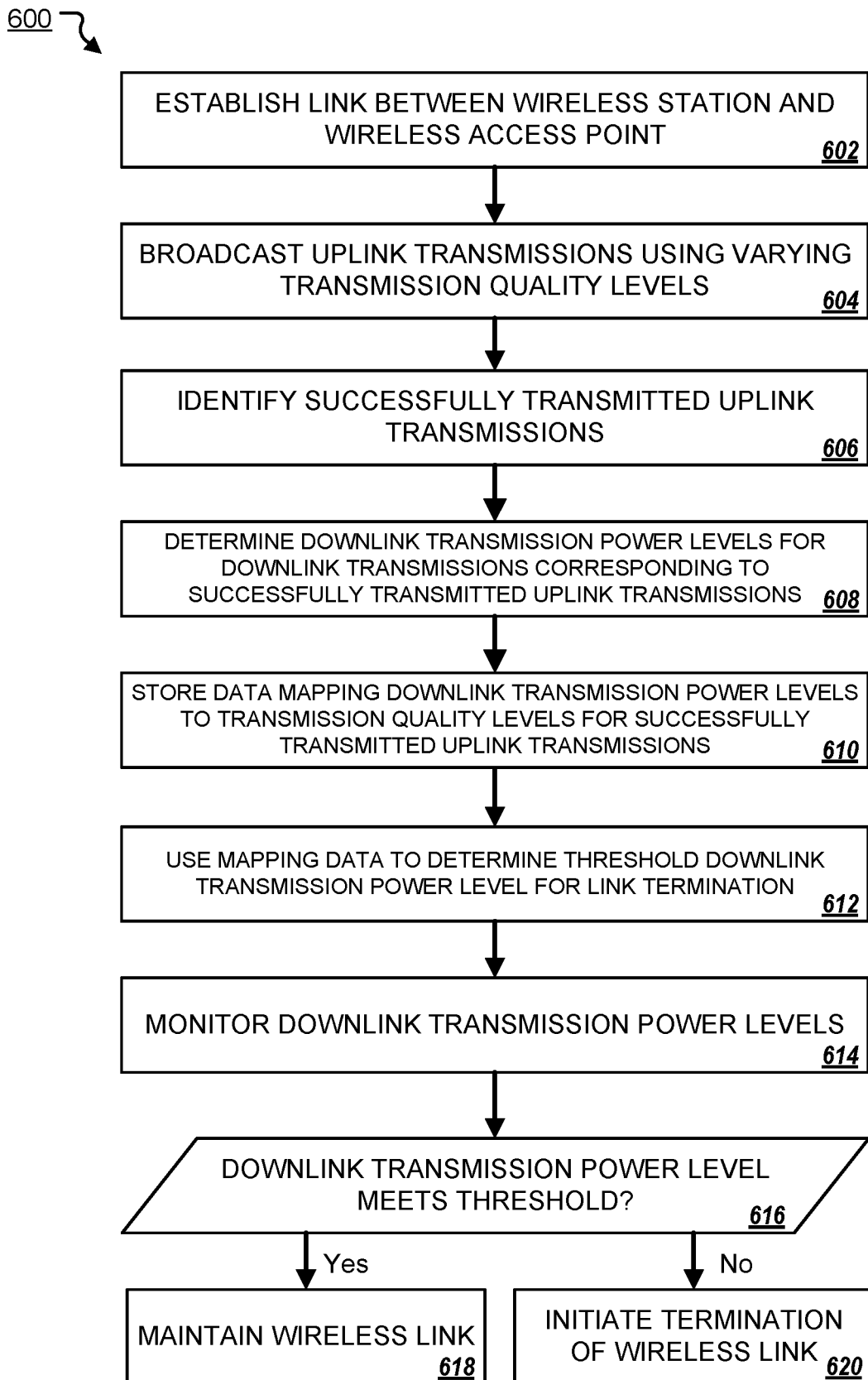
FIG. 6 is a flowchart of an example process for dynamically setting exit criteria for terminating a wireless connection

FIG. 6 is a flowchart of an example process 600 for dynamically setting exit criteria for terminating a wireless connection. In some implementations, the process 600 is performed using a wireless communication device, e.g., wireless communication device 102, and an access point, for example, access points 104 or 106.

At stage 602, the wireless communication device establishes a wireless link (connection) with an access point. For example, the wireless communication device may discover the access point by active or passive scanning, may determine that a detected pre-connection downlink transmission from the access point meets one or more entry criteria, and may initiate a connection procedure to establish the wireless link.

At stage 604, over a period of time during the course of the link, the wireless communication device can vary the quality of its uplink transmissions to the access point. The variation can be performed explicitly for the purpose of this process 600 for deriving exit criteria, or the variation may occur incidentally as a result of the wireless communication device's typical adjustments to transmission quality parameters responsive to changing conditions that, for example, require the wireless communication device to compensate for fading or other phenomena over time. The quality of uplink transmissions can be varied by adjusting, for different transmission, the power level of the transmission, the modulation scheme, the coding rate, the guard interval, or a combination of these and/or other quality parameters. In some implementations, the wireless communication device adjusts the quality of its uplink transmissions by transmitting according to the quality parameters defined by different MCS index values.

At stage 606, the wireless communication device identifies uplink transmissions at different quality levels that were successfully transmitted to the access point. In some implementations, these transmissions can be identified by monitoring for acknowledgment transmissions from the access point. If no acknowledgment is received, the uplink transmission may not have been successfully transmitted to and received by the access point. In some implementations, successfully transmitted uplink transmissions can be identified as those transmission for which the access point does not transmit back an indication that the transmissions should be re-transmitted.

At stage 608, the wireless communication device identifies downlink transmissions sent from the access point that correspond to the successfully transmitted uplink transmissions. These corresponding downlink transmissions are generally transmissions received by the wireless communication device in close temporal proximity to the successfully transmitted uplink transmissions. A logical connection may also exist between the successfully transmitted uplink transmissions and corresponding downlink transmissions. For example, the wireless communication device may identify acknowledgments from the access point as downlink transmissions that correspond to the successfully transmitted uplink transmissions. The wireless communication device also determines the downlink transmission power levels for the identified downlink transmissions that correspond to the successfully transmitted uplink transmissions. For example, the wireless communication device may determine the RSSI level of acknowledgments received in response to successfully transmitted uplink transmissions.

At stage 610, the wireless communication device stores data mapping (i) the downlink transmission power levels for the identified downlink transmissions that correspond to the successfully transmitted uplink transmissions to (ii) the transmission quality levels of the successfully transmitted uplink transmissions. For example, the data may indicate that an uplink transmission at $MCS_1$ was successfully transmitted and resulted in a corresponding downlink transmission that was received with an RSSI of −83 dB, and in another instance an uplink transmission at $MCS_0$ was successfully transmitted and resulted in a corresponding downlink transmission that was received with an RSSI of −70 dB. In some implementations, the data includes samples only from the current connection between the wireless communication device and access point. In other implementations, the data includes samples additionally from previous connections between the wireless communication device and the access point.

At stage 612, the system uses the data that indicates the history of uplink transmission quality levels (e.g., MCS levels or individual quality parameters) and corresponding downlink transmission power levels to determine a threshold downlink transmission power level for terminating the link between the wireless communication device and the access point. In some implementations, the threshold is set as or is based on the downlink transmission power level that is mapped to a minimally acceptable uplink transmission quality level. For example, $MCS_1$ may be specified as the minimally acceptable uplink transmission quality level. In some implementations, the modulation and coding schemes are indexed such that lower values indicate schemes that require less SNR to successfully receive than schemes with higher index values. For instance, an $MCS_1$ transmission typically requires less SNR to successfully receive than an $MCS_2$ transmission, an $MCS_2$ transmission typically requires less SNR to successfully receive than an $MCS_3$ transmission, and so on. The wireless communication device, or a remote system in communication with the wireless communication device, may analyze the history of successful uplinks to determine a downlink transmission power level (e.g., an RSSI level) corresponding to $MCS_1$ uplink transmissions. If there are multiple $MCS_1$ uplink transmissions represented in the data, the system may average the corresponding downlink transmission power levels for these $MCS_1$ uplink transmissions to generate the exit threshold, or use other criteria to select a representative downlink power level as the exit threshold (e.g., the mean, median, or mode of power levels, or the highest or lowest power level).

After the threshold downlink transmission power level for link termination has been set, at stage 614 the wireless communication device continues to monitor the strength of downlink transmissions from the access point during the course of the connection with the access point. The measured power level of the downlink transmissions (e.g., an RSSI level) is compared to the threshold level (stage 616), and if the measured power level is determined to meet the threshold power level, then the wireless communication device maintains its current connection with the access point (stage 618). However, if the measured power level is determined not to meet the threshold power level for a period of time, then the wireless communication device can initiate termination of its current connection with the access point (stage 620). In some implementations the wireless communication device terminates the connection only if other access point or networks are available that are likely to provide better performance than the currently connected access point. In some implementations, the wireless communication device can immediately terminate the connection upon identifying that the measured downlink transmission power levels do not meet the threshold power level.

Figure 7:
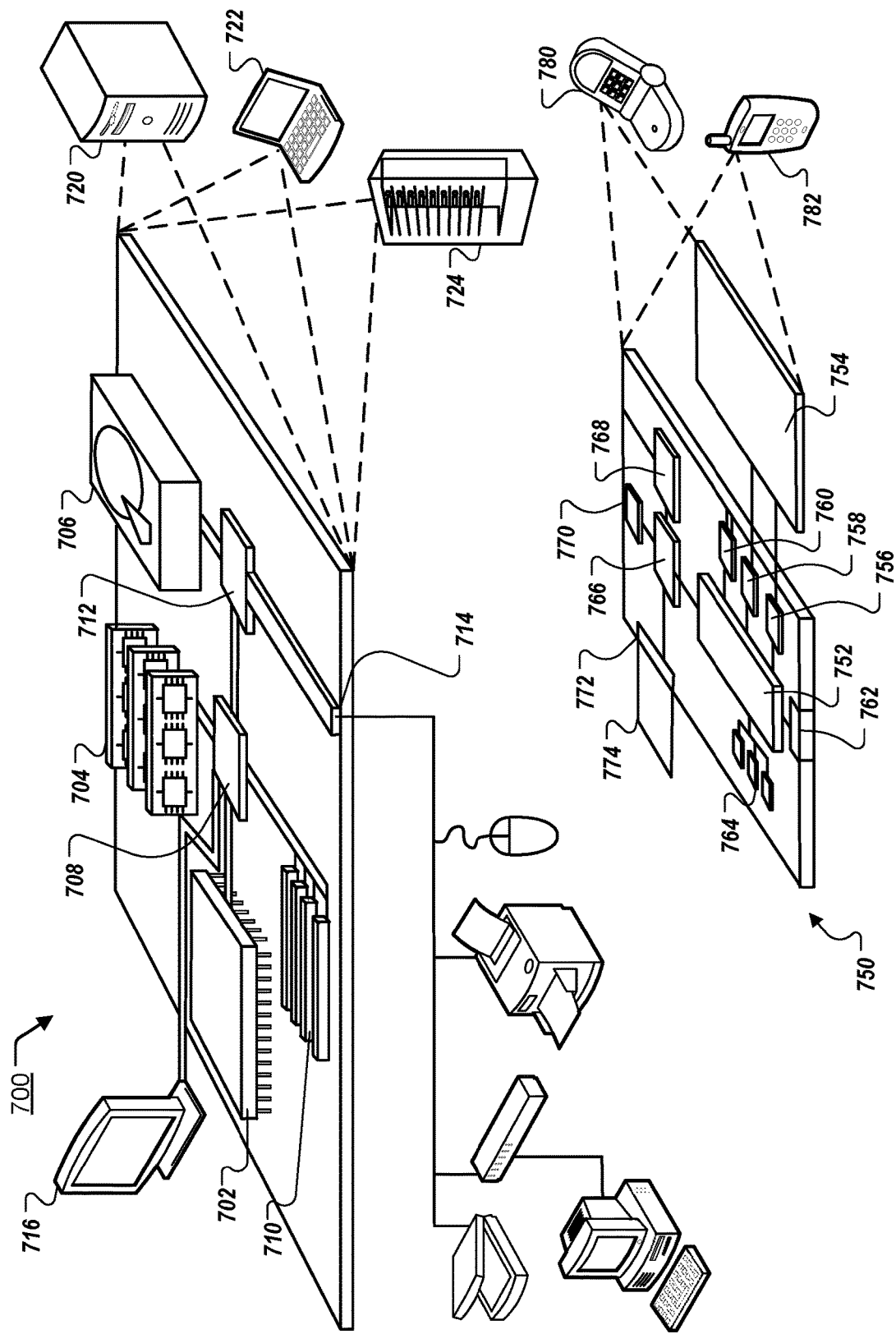
FIG. 7 shows an example of a computing device and a mobile computing device that can be used to implement the techniques described herein.

FIG. 7 shows an example of a computing device 700 and a mobile computing device that can be used to implement the techniques described herein. The computing device 700 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 may also be another form of computer-readable medium, such as a magnetic or optical disk.

The storage device 706 is capable of providing mass storage for the computing device 700. In some implementations, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. The computer program product may also contain instructions that, when executed, perform one or more methods, such as those described above. The computer program product can also be tangibly embodied in a computer- or machine-readable medium, such as the memory 704, the storage device 706, or memory on the processor 702.

The high-speed interface 708 manages bandwidth-intensive operations for the computing device 700, while the low-speed interface 712 manages lower bandwidth-intensive operations. Such allocation of functions is exemplary only. In some implementations, the high-speed interface 708 is coupled to the memory 704, the display 716 (e.g., through a graphics processor or accelerator), and to the high-speed expansion ports 710, which may accept various expansion cards (not shown). In the implementation, the low-speed interface 712 is coupled to the storage device 706 and the low-speed expansion port 714. The low-speed expansion port 714, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. In addition, it may be implemented in a personal computer such as a laptop computer 722. It may also be implemented as part of a rack server system 724. Alternatively, components from the computing device 700 may be combined with other components in a mobile device (not shown), such as a mobile computing device 750. Each of such devices may contain one or more of the computing device 700 and the mobile computing device 750, and an entire system may be made up of multiple computing devices communicating with each other.

The mobile computing device 750 includes a processor 752, a memory 764, an input/output device such as a display 754, a communication interface 766, and a transceiver 768, among other components. The mobile computing device 750 may also be provided with a storage device, such as a micro-drive or other device, to provide additional storage. Each of the processor 752, the memory 764, the display 754, the communication interface 766, and the transceiver 768, are interconnected using various buses, and several of the components may be mounted on a common motherboard or in other manners as appropriate.

The processor 752 can execute instructions within the mobile computing device 750, including instructions stored in the memory 764. The processor 752 may be implemented as a chipset of chips that include separate and multiple analog and digital processors. The processor 752 may provide, for example, for coordination of the other components of the mobile computing device 750, such as control of user interfaces, applications run by the mobile computing device 750, and wireless communication by the mobile computing device 750.

The processor 752 may communicate with a user through a control interface 758 and a display interface 756 coupled to the display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may provide communication with the processor 752, so as to enable near area communication of the mobile computing device 750 with other devices. The external interface 762 may provide, for example, for wired communication in some implementations, or for wireless communication in other implementations, and multiple interfaces may also be used.

The memory 764 stores information within the mobile computing device 750. The memory 764 can be implemented as one or more of a computer-readable medium or media, a volatile memory unit or units, or a non-volatile memory unit or units. An expansion memory 774 may also be provided and connected to the mobile computing device 750 through an expansion interface 772, which may include, for example, a SIMM (Single In Line Memory Module) card interface. The expansion memory 774 may provide extra storage space for the mobile computing device 750, or may also store applications or other information for the mobile computing device 750. Specifically, the expansion memory 774 may include instructions to carry out or supplement the processes described above, and may include secure information also. Thus, for example, the expansion memory 774 may be provide as a security module for the mobile computing device 750, and may be programmed with instructions that permit secure use of the mobile computing device 750. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. The computer program product contains instructions that, when executed, perform one or more methods, such as those described above. The computer program product can be a computer- or machine-readable medium, such as the memory 764, the expansion memory 774, or memory on the processor 752. In some implementations, the computer program product can be received in a propagated signal, for example, over the transceiver 768 or the external interface 762.

The mobile computing device 750 may communicate wirelessly through the communication interface 766, which may include digital signal processing circuitry where necessary. The communication interface 766 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 768 using a radio-frequency. In addition, short-range communication may occur, such as using a Bluetooth, WiFi, or other such transceiver (not shown). In addition, a GPS (Global Positioning System) receiver module 770 may provide additional navigation- and location-related wireless data to the mobile computing device 750, which may be used as appropriate by applications running on the mobile computing device 750.

The mobile computing device 750 may also communicate audibly using an audio codec 760, which may receive spoken information from a user and convert it to usable digital information. The audio codec 760 may likewise generate audible sound for a user, such as through a speaker, e.g., in a handset of the mobile computing device 750. Such sound may include sound from voice telephone calls, may include recorded sound (e.g., voice messages, music files, etc.) and may also include sound generated by applications operating on the mobile computing device 750.

The mobile computing device 750 may be implemented in a number of different forms, as shown in the figure. For example, it may be implemented as a cellular telephone 780. It may also be implemented as part of a smart-phone 782, personal digital assistant, or other similar mobile device.

Various implementations of the computer-implemented systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Logs (e.g., an activities log) described herein can be implemented as digital data stored in a physical memory structure that is readable by a computer. In situations in which the systems, methods, devices, and other techniques here collect personal information (e.g., context data) about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Although various implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method comprising:
   identifying, by a wireless communication device, an access point for a wireless network;
   determining, by the wireless communication device, a downlink transmission quality level of a transmission from the access point;
   identifying a threshold quality level for initiating connection to the access point, wherein the threshold quality level is (i) based on a lowest downlink transmission quality level for which the wireless communication device or another wireless communication device previously attempted to connect to the access point with at least a threshold rate of success and (ii) lower than a default downlink transmission quality level for initiating the connection to the access point;
   determining whether the downlink transmission quality level of the transmission from the access point meets the threshold quality level; and
   initiating, by the wireless communication device and in response to determining that the downlink transmission quality level of the transmission from the access point meets the threshold quality level, a connection procedure to establish a wireless connection between the wireless communication device and the access point.

2. The computer-implemented method of claim 1, wherein identifying the threshold quality level comprises:
   selecting the threshold quality level to be equal to the lowest downlink transmission quality level.

3. The computer-implemented method of claim 1, wherein the downlink transmission quality level comprises a downlink transmission power level, wherein the threshold quality level comprises a threshold power level, and wherein the lowest downlink transmission quality level comprises a lowest downlink transmission power level.

4. The computer-implemented method of claim 1, wherein the downlink transmission quality level comprises a downlink modulation and coding scheme (MCS) index value, wherein the threshold quality level comprises a threshold MCS index value, and wherein the lowest downlink transmission quality level comprises a lowest downlink transmission MCS index value.

5. The computer-implemented method of claim 1, wherein the downlink transmission quality level of the transmission corresponds to a particular frequency channel of the access point, wherein the threshold quality level is identified for initiating connection to the access point using the particular frequency channel thereof, and wherein the lowest downlink transmission quality level corresponds to previous attempts by the wireless communication device or another wireless communication device to connect to the access point using the particular frequency channel thereof.

6. The computer-implemented method of claim 1, further comprising:
   determining a result of the connection procedure; and
   based on the result of the connection procedure, updating a cumulative rate of success in establishing wireless connections with the access point when the downlink transmission quality level is observed.

7. The computer-implemented method of claim 6, wherein the result of the connection procedure is considered a success if at least one of: (i) the connection procedure results in the wireless connection being established between the wireless communication device and the access point, (ii) the wireless connection is maintained for at least a threshold amount of time, or (iii) a quality of transmissions using the wireless connection meets a threshold quality.

8. The computer-implemented method of claim 1, wherein the lowest downlink transmission quality level is determined using a database that represents, for each respective downlink transmission quality level of a plurality of different downlink transmission quality levels, a cumulative success rate of the wireless communication device or another wireless communication device in connecting to the access point when the respective downlink transmission quality level was observed.

9. A non-transitory computer-readable storage medium having stored thereon instructions that, when executed by a wireless communication device, cause the wireless communication device to perform operations comprising:
   identifying an access point for a wireless network;

determining a downlink transmission quality level of a transmission from the access point;

identifying a threshold quality level for initiating connection to the access point, wherein the threshold quality level is (i) based on a lowest downlink transmission quality level for which the wireless communication device or another wireless communication device previously attempted to connect to the access point with at least a threshold rate of success and (ii) lower than a default downlink transmission quality level for initiating the connection to the access point;

determining whether the downlink transmission quality level of the transmission from the access point meets the threshold quality level; and initiating, in response to determining that the downlink transmission quality level of the transmission from the access point meets the threshold quality level, a connection procedure to establish a wireless connection between the wireless communication device and the access point.

10. The non-transitory computer-readable storage medium of claim 9, wherein identifying the threshold quality level comprises:
selecting the threshold quality level to be equal to the lowest downlink transmission quality level.

11. The non-transitory computer-readable storage medium of claim 9, wherein the downlink transmission quality level of the transmission corresponds to a particular frequency channel of the access point, wherein the threshold quality level is identified for initiating connection to the access point using the particular frequency channel thereof, and wherein the lowest downlink transmission quality level corresponds to previous attempts by the wireless communication device or another wireless communication device to connect to the access point using the particular frequency channel thereof.

12. A computer-implemented method comprising:
establishing a wireless connection between a wireless communication device and an access point for a wireless network;
identifying uplink transmissions that were successfully transmitted from the wireless communication device to the access point;
determining downlink transmission power levels for downlink transmissions that correspond to the uplink transmissions that were successfully transmitted from the wireless communication device to the access point;
identifying a minimally acceptable uplink transmission quality level;
determining a threshold downlink power level for initiating termination of the wireless connection between the wireless communication device and the access point, wherein the threshold downlink power level is based on the downlink transmission power levels at a receiver for one or more of the downlink transmissions that correspond to one or more of the uplink transmissions that were successfully transmitted from the wireless communication device to the access point at the minimally acceptable uplink transmission quality level, and wherein the threshold downlink power level is lower than the downlink transmission power levels at the receiver for the one or more of the downlink transmissions; and
using the threshold downlink power level to determine whether to initiate the termination of the wireless connection between the wireless communication device and the access point.

13. The computer-implemented method of claim 12, wherein identifying the uplink transmissions that were successfully transmitted from the wireless communication device to the access point comprises transmitting a plurality of uplink transmissions at different quality levels using one or more of (i) different power levels, (ii) different modulation schemes, (iii) different coding rates, or (iv) different guard intervals.

14. The computer-implemented method of claim 12, wherein determining the downlink transmission power levels for the downlink transmissions comprises:
receiving, from the access point, acknowledgements confirming reception, by the access point, of the uplink transmissions that were successfully transmitted from the wireless communication device to the access point, wherein the acknowledgements comprise representations of the downlink transmission power levels for the downlink transmissions.

15. The computer-implemented method of claim 12, wherein identifying the minimally acceptable uplink transmission quality level comprises:
selecting a minimally acceptable modulation and coding scheme (MCS) index value.

16. The computer-implemented method of claim 12, wherein determining the threshold downlink power level comprises:
determining the downlink transmission power levels at the receiver using a mapping between (i) a plurality of downlink transmission power levels for a plurality of downlink transmissions that correspond to a plurality of uplink transmissions that were successfully transmitted from the wireless communication device to the access point during one or more wireless connections between the wireless communication device and the access point and (ii) respective uplink transmission quality levels of the plurality of uplink transmissions, wherein the one or more wireless connections comprise the established wireless connection.

17. The computer-implemented method of claim 12, wherein determining the threshold downlink power level comprises:
identifying a plurality of downlink transmission power levels at the receiver for a plurality of the downlink transmissions that correspond to a plurality of the uplink transmissions that were successfully transmitted from the wireless communication device to the access point at the minimally acceptable uplink transmission quality level; and
determining the threshold downlink power level based on the plurality of downlink transmission power levels.

18. The computer-implemented method of claim 17, wherein determining the threshold downlink power level based on the plurality of downlink transmission power levels comprises:
determining the threshold downlink power level based on one or more of a mean, a median, a mode, a minimum, or a maximum of the plurality of downlink transmission power levels.

19. The computer-implemented method of claim 12, wherein using the threshold downlink power level to determine whether to initiate the termination of the wireless connection comprises:
initiating the termination of the wireless connection when a measured downlink power level of the wireless connection falls below the threshold downlink power level for at least a predetermined period of time.

20. The computer-implemented method of claim 12, wherein using the threshold downlink power level to determine whether to initiate the termination of the wireless connection comprises:
   initiating the termination of the wireless connection when (i) a measured downlink power level of the wireless connection falls below the threshold downlink power level and (ii) another access point is available.

* * * * *